United States Patent
Ter Haar et al.

(10) Patent No.: US 9,625,055 B2
(45) Date of Patent: Apr. 18, 2017

(54) TAPERED THROTTLING VALVE

(75) Inventors: Max Robert Anthony Ter Haar, Rijswijk (NL); Zvonimir Opic, Amersfoort (NL); Marco Betting, Rijswijk (NL); Swie Siang Sebastiaan Kwee, Amstelveen (NL); Cornelis Antonie Tjeenk Willink, Rijswijk (NL)

(73) Assignee: TWISTER B.V., Rijswijk (NL)

( * ) Notice: Subject to any disclaimer, the term of this patent is extended or adjusted under 35 U.S.C. 154(b) by 778 days.

(21) Appl. No.: 13/388,020

(22) PCT Filed: Jul. 30, 2009
(Under 37 CFR 1.47)

(86) PCT No.: PCT/NL2009/050469
§ 371 (c)(1),
(2), (4) Date: Jul. 13, 2012

(87) PCT Pub. No.: WO2011/014059
PCT Pub. Date: Feb. 3, 2011

(65) Prior Publication Data
US 2012/0285546 A1    Nov. 15, 2012

(51) Int. Cl.
*F16K 47/08*    (2006.01)

(52) U.S. Cl.
CPC ......... *F16K 47/08* (2013.01); *Y10T 137/0379* (2015.04); *Y10T 137/7764* (2015.04)

(58) Field of Classification Search
CPC . F16K 1/54; F16K 31/36; F16K 47/00; F16K 47/08
USPC ............ 137/220–222, 625.38, 808, 812–813
See application file for complete search history.

(56) References Cited

U.S. PATENT DOCUMENTS

| | | | | | |
|---|---|---|---|---|---|
| 1,075,635 | A | * | 10/1913 | Elkin | 123/441 |
| 1,802,897 | A | * | 4/1931 | Holden et al. | 251/210 |
| 3,776,278 | A | * | 12/1973 | Allen | 137/625.38 |
| 3,990,475 | A | * | 11/1976 | Myers | 137/625.3 |
| 4,024,891 | A | * | 5/1977 | Engel et al. | 137/625.3 |
| 4,041,982 | A | * | 8/1977 | Lindner | 137/625.3 |
| 4,080,982 | A | * | 3/1978 | Maezawa | E02B 8/06 137/219 |
| 4,149,563 | A | * | 4/1979 | Seger | F16K 3/34 137/625.3 |
| 4,244,388 | A | * | 1/1981 | Feiss | 137/115.16 |
| 4,261,389 | A | * | 4/1981 | Hager et al. | 137/625.38 |
| 4,375,821 | A | * | 3/1983 | Nanao | 137/239 |
| 4,938,450 | A | * | 7/1990 | Tripp et al. | 251/30.03 |
| 5,014,746 | A | * | 5/1991 | Heymann | 137/625.3 |

(Continued)

FOREIGN PATENT DOCUMENTS

| | | |
|---|---|---|
| GB | 1 540 406 | 2/1979 |
| WO | 0009917 | 2/2000 |

(Continued)

*Primary Examiner* — Kevin Murphy
*Assistant Examiner* — Daniel P Donegan
(74) *Attorney, Agent, or Firm* — Tucker Ellis LLP

(57) ABSTRACT

The invention relates to a throttling valve comprising a fluid inlet (29) and a fluid outlet (27). The throttling valve is arranged to control a flux of a fluid stream flowing via a flow path from the fluid inlet (29) to the fluid outlet (27). The flow path comprises a plurality of openings (330) which, in use, create a pressure reduction over the throttling valve and thereby a cooling effect of the fluid. The openings (330) widen in a downstream direction.

17 Claims, 8 Drawing Sheets

(56) References Cited

U.S. PATENT DOCUMENTS

| | | | | |
|---|---|---|---|---|
| 5,209,259 | A * | 5/1993 | Dear et al. | 137/561 A |
| 5,575,618 | A * | 11/1996 | Brandon | F01D 25/00 137/549 |
| 5,964,248 | A * | 10/1999 | Enarson | F01D 17/143 137/625.37 |
| 6,505,646 | B1 * | 1/2003 | Singleton | F16K 47/08 137/625.3 |
| 6,766,826 | B2 * | 7/2004 | Baumann | F16K 47/08 137/625.3 |
| 6,973,941 | B2 * | 12/2005 | Baumann | F16K 3/267 137/625.37 |
| 7,152,628 | B2 * | 12/2006 | Folk et al. | 137/625.33 |
| 8,281,812 | B2 * | 10/2012 | Usowicz et al. | 137/625.15 |
| 8,490,651 | B2 * | 7/2013 | Cheng et al. | 137/625.3 |
| 8,522,820 | B2 * | 9/2013 | Biwanski et al. | 137/625.3 |
| 8,528,360 | B2 * | 9/2013 | Betting et al. | 62/619 |
| 8,657,930 | B2 * | 2/2014 | Betting et al. | 95/269 |
| 8,800,599 | B2 * | 8/2014 | Betting | 137/625.38 |
| 2003/0034074 | A1 * | 2/2003 | McCarty et al. | 137/625.3 |
| 2004/0118455 | A1 * | 6/2004 | Welty et al. | 137/375 |
| 2004/0261866 | A1 * | 12/2004 | Suzuki et al. | 137/630.15 |
| 2005/0092961 | A1 * | 5/2005 | Ucman | 251/337 |
| 2008/0044238 | A1 * | 2/2008 | Delves et al. | 406/130 |
| 2008/0173363 | A1 * | 7/2008 | Betting | 137/625.28 |
| 2010/0281959 | A1 * | 11/2010 | Berndt | 73/61.56 |

FOREIGN PATENT DOCUMENTS

| | | | | |
|---|---|---|---|---|
| WO | 2006/036861 | 4/2006 | | |
| WO | 2006070020 | 7/2006 | | |
| WO | 2009/015094 | 1/2009 | | |
| WO | WO 2010117259 A1 * | 10/2010 | | B01D 45/16 |

* cited by examiner

TAPERED THROTTLING VALVE

CLAIM OF PRIORITY

The present application is a 371 of International Patent Application No. of PCT/NL2009/050469, by Max Robert Anthony Ter Haar, et al., filed Jul. 13, 2012.

TECHNICAL FIELD

The present invention relates to a throttling valve.

BACKGROUND

Throttling valves or control valves are known from the prior art. These valves may be used for controlling the flux of a fluid stream and possibly also for enlarging liquid droplet sizes in the fluid stream flowing through a throttling valve. The term throttling valve is used to denote valves to control either one or more process parameters such as, but not limited to, flow, pressure, temperature, liquid level etc.

In the oil and gas industry control valves are used to control pressure, level, temperature and flow. In some cases these control valves operate at choked conditions, once sufficient pressure drop is created over the control valve. In processing natural gas this pressure reduction over a valve causes the temperature to drop without extracting heat or work from the gas (i.e. adiabatic). This so called throttling process is isenthalpic by nature since part of the potential energy which was available for thermodynamic work, has been dissipated inside the valve. For real gas conditions—such as high pressure natural gas—intermolecular forces are dominated by association forces, hence said isenthalpic expansion process results in what is known as Joule-Thompson (JT) cooling. The resulting temperature decrease is merely due to the decrease of the internal molecular energy whilst the enthalpy remained unchanged. The valve creating this pressure reduction is called a JT valve. The cooling effect over a JT valve may be used to condense a part of the natural gas stream, such that a liquefied and/or solidified fraction can be separated in a vessel. For the majority of these separator vessels the driving force is either inertia or gravity forces or in other words the masses of the liquefied drops determine the efficiency of the separation. Such a Low Temperature Separator preceded by a JT valve is normally referred to as a JT-LTS system.

For instance, a traditional cage-valve is known for control service as supplied by Mokveld Valves B.V. in which the flux of fluid is throttled over a perforated sleeve 23. A piston-type valve body 22 may be provided in the perforated sleeve 23 to control the flux through the perforated sleeve 23. This cage-valve is described in more detail below with reference to FIG. 1a-d.

The conventional Mokveld throttling valve shown in FIG. 1a comprises a valve housing 21 in which a piston-type valve body 22 is slideably (see arrow 8) arranged in the associated perforated sleeve 23 such that by rotation of a gear wheel 24 at a valve shaft 25 a teethed piston rod 26 pushes the piston type valve body up and down into a fluid outlet channel 27 as illustrated by arrow 28. The valve has a fluid inlet channel 29 which has an annular downstream section 29A that may surround the valve body 22 and/or perforated sleeve 23 and the flux of fluid which is permitted to flow from the fluid inlet channel 29 into the fluid outlet channel 27 is controlled by the axial position of the piston-type valve body 22 relative to the associated perforated sleeve 23.

The conventional sleeve 23 comprises openings 30—perforations, slots or holes—that have a radial orientation i.e. rectangular to the cylindrical surface of the sleeve 23. This is shown in FIG. 1b, being a cross-sectional view of the perforated sleeve 23.

By displacing the valve body 22 in the sleeve 23 in axial direction the flow area can be controlled.

As illustrated in FIG. 1c the flow pattern in a cage valve 23 with radial openings is highly disordered, hence introducing high shear forces causing droplets to break up into smaller droplets. FIG. 1d schematically illustrates the uniform mist flow with small liquid droplets in the fluid outlet channel 27, and illustrates that the concentration of droplets in the fluid outlet channel 27 is substantially uniform (indicated by the uniform grey shading).

Even though the prime function of a JT valve is flow rate control, it is often forgotten that the second function is to create a separable liquid phase. In the gas processing industry the mean droplet size resulting from an isenthalpic expansion over a JT valve is unknown, hence the separation efficiency of downstream separators is to a large extent unknown. From time to time gas quality problems do occur due to suboptimal separation efficiency. In those cases it is often the hydrocarbon dew point, which remains too high, which indicates that especially hydrocarbon droplets tend to be too small.

WO2006070020 describes an improved valve, that increases the separation efficiency. This will be discussed in more detail below with reference to FIG.'s 2a-2d.

The valve shown in FIG. 2a comprises a valve housing 21 in which a piston-type valve body 22 is slideably (see arrow 8) arranged in the associated perforated sleeve or cage 123 such that by rotation of a gear wheel 24 at a valve shaft 25 a teethed piston rod 26 pushes the piston type valve body up and down into a fluid outlet channel 27 as illustrated by arrow 28. The valve has an fluid inlet channel 29 which has an annular downstream section 29A that may surround the valve body 22 and/or perforated sleeve 123 and the flux of fluid which is permitted to flow from the fluid inlet channel 29 into the fluid outlet channel 27 is controlled by the axial position of the piston-type valve body 22 relative to the associated perforated sleeve 123. The valve may furthermore comprise a conical central body 15 which is substantially co-axial to a central axis 11 of the fluid outlet channel 27 and which generates an outlet channel 27 having a gradually increasing cross-sectional area in downstream direction, thereby generating a controlled deceleration of the fluid flux in the outlet channel 27 and constituting a vortex that promotes growth and coalescence of condensed fluid droplets or bubbles in oil.

FIG. 2b illustrates that in the throttling valve the perforated sleeve 123 comprises tilted or non-radial openings 130, that are drilled in a selected partially tangential orientation relative to a central axis of the perforated sleeve 123 such that the longitudinal axis 12 of each of the openings 130 crosses the central axis 11 at a distance D, which is between 0.2 and 1, preferably between 0.5 and 0.99 times the internal radius R of the sleeve 123.

The tilted openings 130 create a swirling flow in the fluid stream flowing through the fluid outlet channel 27 as illustrated by arrow 14. The swirling motion may also be imposed by a specific geometry of the valve trim and/or valve stem and/or valve housing. In the valve according to FIG.'s 2a and 2b the available free pressure is used for adiabatic expansion to create a swirling flow in the fluid stream. Since no thermodynamic work is exerted on, or delivered by the expanding fluid with respect to its surroundings, said adiabatic expansion can be considered as an isenthalpic process. The kinetic energy is mainly dissipated through dampening of the vortex along an extended pipe length downstream the valve.

As illustrated in FIG. 2c the flow pattern in a cage valve with tangential openings is ordered and has a swirling motion, hence reducing shear forces which can cause droplets to break up into smaller droplets and promotes coalescence of micro droplets/bubbles. FIG. 2d schematically illustrates the mist flow with small liquid droplets concentrated in the outer perimeter of fluid outlet channel 27.

As illustrated in FIG. 2d the presence of a swirling motion in the throttling valve concentrates the droplets 18 in a reduced flow area 7A at the outer boundary (about 60% of total cross sectional area) of the fluid outlet channel 27 (higher concentration indicated by darker shading), such that the droplet number density increases with a factor of circa 1.7. Furthermore the rate of turbulent dissipation in de vortex core is large because of the high tangential velocity.

It will be understood that the creation of large liquid droplets (or large gas bubbles in case of oil or condensate degassing) in the outlet channel 27 of the throttling valve will make it easier to separate the liquid and gaseous phase in a fluid separation assembly that may be arranged downstream of the throttling valve. Such a subsequent fluid separation assembly may comprise one or more gravity and/or cyclonic separation vessels.

The fluid could be either 1) a pre-dominantly gaseous carrier with a liquid phase or 2) a predominantly liquid carrier with an immiscible liquid and/or gaseous phase. An example of option 1) is a LTS process with a JT-valve fed by a natural gas stream with liquid fraction of condensates, water and glycol. An example of option 2) is an oil or hydrocarbon condensate stabilization process with a throttling valve fed by an oil or condensate stream with liquid fraction of water and/or glycol and entrained gas.

FIG.'s 2c and 2d illustrate that the advantage of creating a swirling flow in the outlet channel of the valve is twofold:
1. Regular velocity pattern->less interfacial shear->less droplet/bubble break-up->larger drops, and
2. Concentration of droplets in the outer circumference 7A of the flow area of the fluid outlet channel 7 or concentration of droplets in the centre of fluid outlet channel 7->large number density->improved coalescence->larger drops/bubbles 18.

Solidification

By cooling a fluid stream in a process (e.g. expansion cooling, refrigeration cooling etc) the condensed fraction may (partially) solidify to for instance crystalline solids. For well fluids produced from a subterranean reservoir, these solids may comprise gas hydrates, oil waxes, asphaltenes, resins, carbon dioxide, hydrogen sulphide etc.

Gas clathrate, also called gas hydrate or gas ice, is a solid form of water that contains a large amount of gas molecules within its crystal structure. Such gas clathrates are found in formation fluids e.g. oil or natural gas, where some of the gas components (e.g. methane, ethane, propane, (iso)butane, carbon dioxide, hydrogen sulphide) can form hydrates in conjunction with water at elevated pressure. These hydrates usually exist in agglomerated solid forms that are essentially insoluble in the fluid itself.

Thermodynamic conditions favouring gas hydrate formation are often found in pipelines, transfer lines or other conduits, valves and/or safety devices, vessels, heat exchangers etc. This is highly undesirable because the gas crystals might agglomerate and cause plugging or blockage of the flow-line, valves and instrumentation. This results in shutdown, loss of production, risk of explosion and injury or unintended release of hydrocarbons into the environment either on-land or off-shore. Accordingly, natural gas hydrates are of substantial interest as well as a concern to many industries, particularly the petroleum and natural gas industries.

Carbon dioxide ($CO_2$) crystals may form when cooling a $CO_2$ containing well fluid to temperatures below −60° C. Processes intentionally processing fluids to produce $CO_2$ solids are known from WO9901706 and WO03062725.

Waxes, resins, asphaltenes may form in a well fluid containing oil which is cooled for instance in a pressure let down (i.e flash) vessel.

Accordingly, the throttling valves as described above with reference to FIG.'s 1a-2d are prone to such problems. During use, the (tilted) openings 30, 130 may get (partially) blocked by solids comprised in the fluid stream. Said solids may then tend to stick to the interior of the valve, such as to the entrance and inside of the (tilted) perforations 30, 130, thereby partially or completely blocking the (tilted) openings 30, 130.

Short Description

It is an object to provide a throttling valve that overcomes at least one of the above identified problems of openings getting obstructed by solids, such as hydrates.

According to an embodiment, there is provided a throttling valve comprising a fluid inlet and a fluid outlet, the throttling valve being arranged to control a flux of a fluid stream flowing via a flow path from the fluid inlet to the fluid outlet, the flow path comprising a plurality of openings which, in use, create a pressure reduction over the throttling valve and thereby a cooling effect of the fluid, wherein the openings widen in a downstream direction. The openings may have a divergent angle $\phi$ in the range 10°-50°. Also, the openings may have a radial, tangential or axial orientation or direction with respect to a central axis. The openings may also have a combination of tangential and axial orientation or direction with respect to a central axis.

Such a throttling valve has the advantages that the openings will have less chance of getting blocked by solids, due to the tapered shape of the openings.

BRIEF DESCRIPTION OF THE DRAWINGS

Embodiments will now be described, by way of example only, with reference to the accompanying schematic drawings in which corresponding reference symbols indicate corresponding parts, and in which.

DETAILED DESCRIPTION OF EMBODIMENTS

Figure 1A:
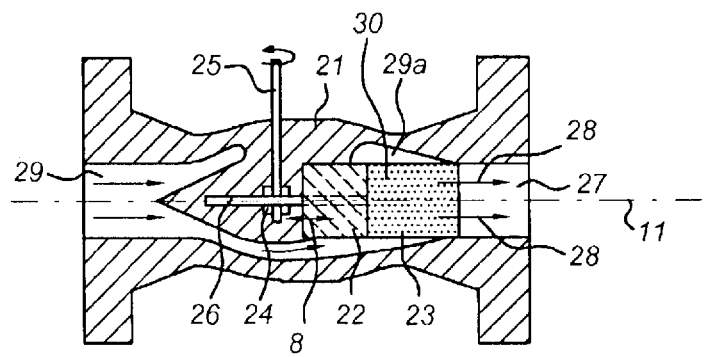
FIGS. 1A-1D schematically show a valve according to the prior art.
Figure 1B:
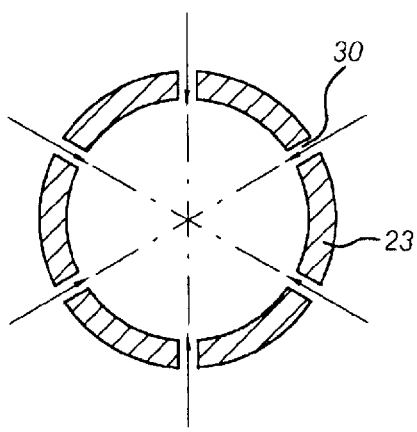
Figure 1C:
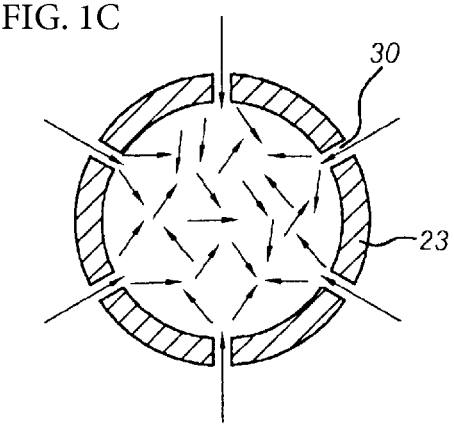
Figure 1D:
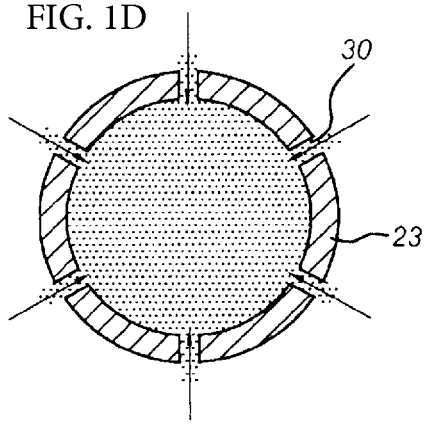
Figure 2A:
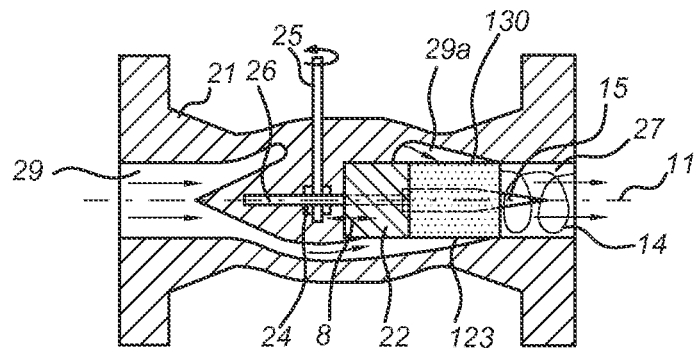
FIGS. 2A-2D schematically show a further valve according to the prior art.
Figure 2B:
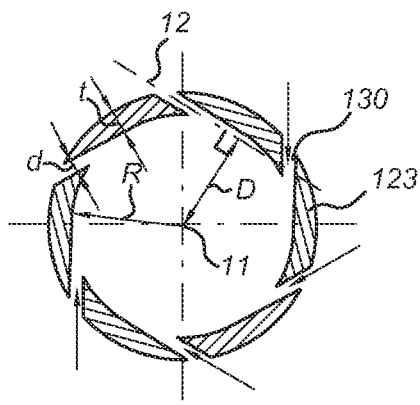
Figure 2C:
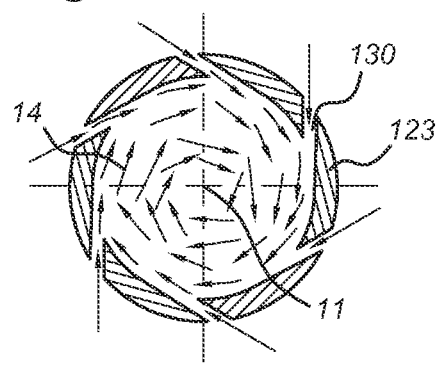
Figure 2D:
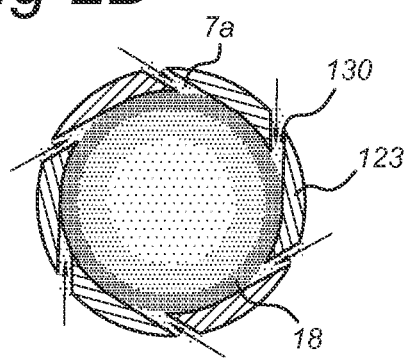

An embodiment will now be described with reference to FIG.'s 3a and 3c, which shows a throttling valve comprising a fluid inlet 29 and a fluid outlet 27, the throttling valve being arranged to control a flux of a fluid stream flowing via a flow path from the fluid inlet 29 to the fluid outlet 27, the flow path comprising a plurality of openings 330 which, in use, create a pressure reduction over the throttling valve and thereby a cooling effect of the fluid, wherein the openings 330 widen in a downstream direction.

The pressure reduction (expansion) and cooling results in condensation and thus liquid droplets are being formed during the expansion along the flow path of the valve. The throttling valve uses the available free pressure for isenthalpic expansion and, in some embodiments, for creating a swirling flow in the fluid stream.

The downstream direction may be defined as the flow direction in use through the openings 330 towards the fluid outlet channel 27. In fact, as will be explained in more detail below, the longitudinal axis defining the orientation of the widening openings 330 may have any suitable orientation, as will be explained in more detail below with reference to FIG.'s 4-7.

It will be understood that such an embodiment may be formed by a throttling valve as described above with reference to FIG.'s 1a-2d, now comprising openings that widen in a downstream direction.

According to an embodiment, the openings (330) have a divergent angle φ in the range 10°-50°. The considerations for choosing a suitable angle will be explained in more detail further below.

Thus, the throttling valve may comprise a valve housing 21 and a perforated sleeve 323, the perforated sleeve 323 comprising the plurality of openings 330.

Figure 3A:
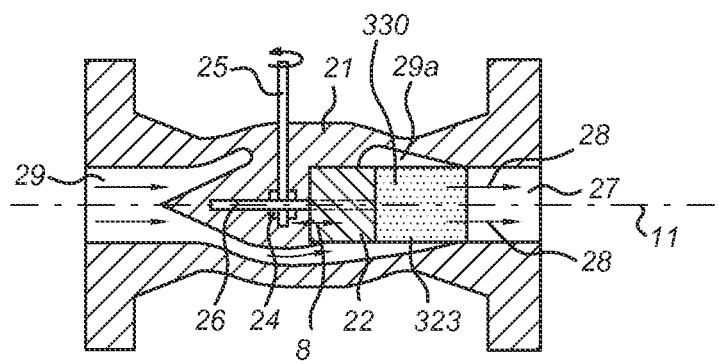
FIGS. 3A-3C schematically shows a side view of a valve according to embodiments, FIGS. 4A-4E schematically shows a further embodiment, FIGS. 5A-5E schematically shows a further embodiment, FIGS. 6A-6D and FIGS. 7A-7B schematically show a further embodiments, FIG. 8 schematically depicts a graph of ice adhesion strength on different surfaces, and FIGS. 9A-9C schematically depicts a further embodiment.
Figure 3B:
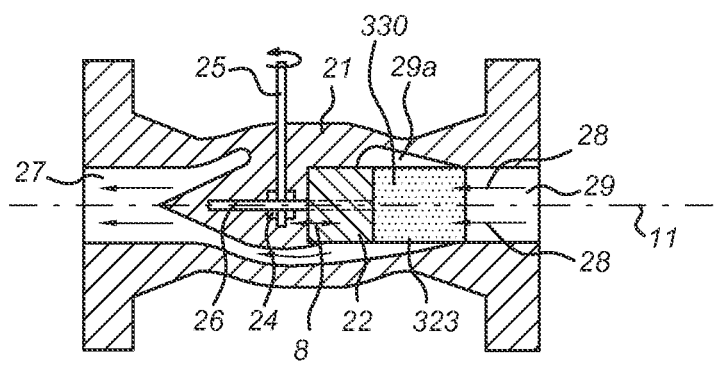
Figure 3C:
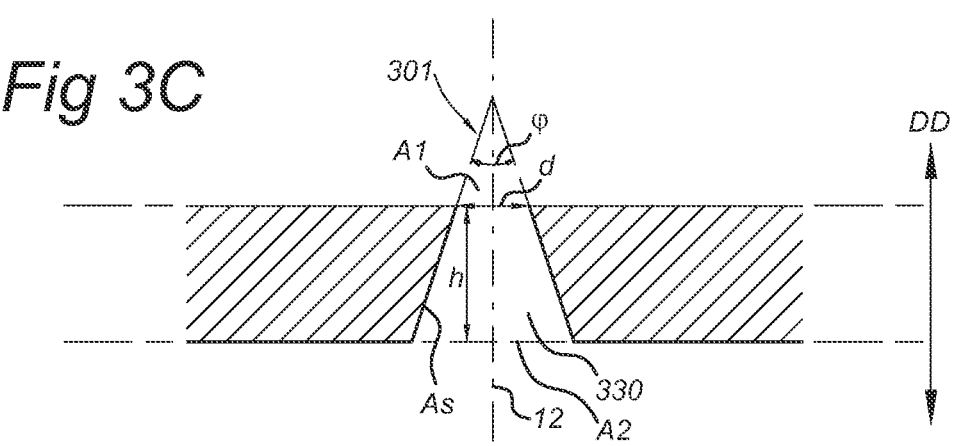

As shown in FIG. 3a, the flow direction may be chosen such that the fluid flows from the outside of the perforated sleeve 323 to the inside of the perforated sleeve 323. However, according to an alternative shown in FIG. 3b, the throttling valve may be used in a reversed direction, i.e. the fluid may flow from the inside of the perforated sleeve 323 to the outside of the perforated sleeve 323. FIG. 3c schematically depicts an opening 330, wherein an arrow DD schematically depicts the downstream direction for 3a or 3b.

The throttling valve may further comprise a piston type valve body 22, the piston type valve body 22 being slideably arranged with respect to said perforated sleeve 323, to control the flux of the fluid stream through the openings 330.

The piston-type valve body 22 and the perforated sleeve 323 may be arranged in accordance with the embodiments described with reference to FIG.'s 1a-d and 2a-d. The perforated sleeve 323 may have a cylinder shape, with a body axis along longitudinal axis 11. The openings 330 may be formed by circumferentially spaced perforations of the sleeve 323. The piston-type valve body 22 may have a cylinder shape that matches the inside of the perforated sleeve 323 and may be positioned inside the sleeve 323 such that an outside surface of the piston-type valve body 22 abuts or is relatively close to an inside surface of the perforated sleeve 323. Furthermore the piston-type valve body 22 can be extended with a conical central body 15 which deflects the fluid flow exiting from the openings of the perforated sleeve 323.

Also, the valve has a fluid inlet channel 29 which has an annular downstream section 29A that may surround the piston-type valve body 22 and/or perforated sleeve 123 and the flux of fluid which is permitted to flow from the fluid inlet channel 29 into the fluid outlet channel 27 is controlled by the axial position of the piston-type valve body 22 relative to the associated perforated sleeve 123.

It is noted that other types of throttling valves, Joule-Thomson or other choke and/or throttling type valves may be used as well, such as a throttling valve in which the piston-type valve body 22 is replaced by a member that is slideably arranged at the outside of the perforated sleeve 323. In that case, the piston-type valve body 22 may comprise a cylinder shaped inner wall that matches the shape and form of the outer wall of the perforated sleeve 123.

The piston-type valve body 22 does not comprise openings or the like and can thus be used to block fluid flowing from the fluid inlet channel 29 to the fluid outlet channel 27. In use, fluid flows from the fluid inlet channel 29 into the fluid outlet channel 27 via a portion of the plurality of openings 330. By changing the relative position of the piston-type valve body 22 and the perforated sleeve 323, less or more openings 330 are present between the fluid inlet channel 29 and the fluid outlet channel 27 allowing passage of fluid. The number of openings 330 may vary between a minimal amount of zero, associated with a fully closed position, to a maximal amount, associated with a fully opened position of the throttling valve.

As described, the openings 330 widen in a downstream direction. This means that the openings 330 have an inlet 301 at an upstream side with a first cross sectional area A1 and an outlet 302 at a downstream side with a second cross sectional area A2, wherein the first cross sectional area A1 is substantially smaller than the second cross sectional area A2: A1<A2. The first cross sectional area A1 may for instance be less than 75% of the second cross sectional area A2. As explained above, the downstream direction may be from the outside to the inside of the perforated sleeve 323, or vice versa.

The openings 330 may have a substantially round cross sectional area. However, other suitable shapes may be conceived as well, such as a rectangular cross sectional area.

The widening openings 330 have the advantage that hydrates will not get stuck in the opening 330, i.e. the openings 330 have a self discharging shape. This will be explained in more detail below.

Solid-Solid Interface

As explained above, hydrates tend to stick to inner walls of the openings 330 as a result of adhesion forces and frictional forces. The adhesion strength ($P_s$) between solid surfaces is determined by interfacial energies between these surfaces as well as the surface finishing (smooth/rough).

The perforated sleeve 323 is for instance made from high alloy steels such as duplex or Cr steels or metals like Titanium or Tungsten or a ceramic material. Therefore, a maximum adhesion strength between a hydrate and an alloy steel surface is assumed of $P_s=12.10^5$ N/m$^2$. Indications of adhesion strengths can be for instance be found in "Adhesive properties of gas hydrates and ice" Bondarev E. A., Groisman A. G. and Savvin A. Z. 1996 (During the $2^{nd}$ International conference on natural gas hydrates)".

Furthermore the interior surface of the perforated sleeve 323 may be coated with a suitable material which repels ice and/or water. Tests with different coated and non-coated surfaces have been performed showing an unambiguous relation between the adhesion strength (ice-surface) and the hysteresis of the water contact angle on said surface. Said empirical relation is shown in FIG. 8, showing ice adhesion strength of a selected surface as a function of surface wettability.

Figure 8:
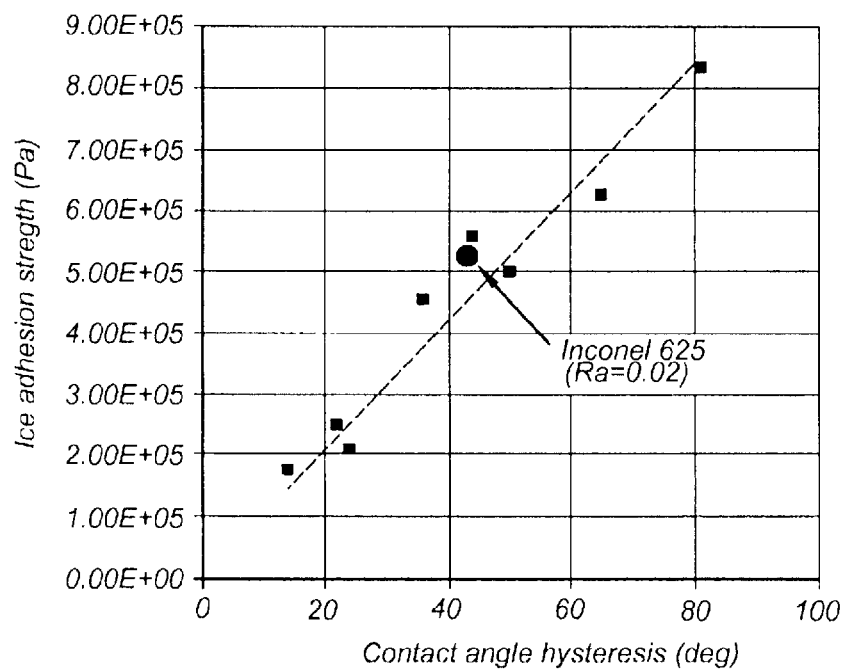

All dots in FIG. 8 represent surfaces of a specific material composition and a specific surface topology. The contact angle hysteresis is defined as the difference of the advancing water contact angle and receding water contact angle. The graph shows that the adhesion strength of water ice reduces when the water contact angle hysteresis decreases.

Divergence Angle

In order to minimize the static friction forces between the interior surface of the openings 330 and possible hydrates in the openings as well as to enable release of hydrates from an opening, embodiments are provided in which the shape of the openings are divergently tapered in a downstream direction or in other words, wherein the openings 330 widen in a downstream direction DD. An example of such an opening 330 is shown in detail in FIG. 3c. The opening 330 has a height h in a downstream direction and a divergence angle φ which typically is 10°. The opening 330 has an inlet 301 with a typical size d.

Below is provided a first order approximation of the physics involved.

For a given application a certain minimal differential pressure $P_d$ is determined. If an opening 330 becomes fully blocked with hydrates a force $F_d = P_d \cdot A_1$ in a direction normal to the cross section of the opening acts on that hydrate, where $A_1$ is the cross sectional area of the inlet of the opening 330.

Likewise a certain adhesion force between the inner wall and the hydrate applies: $F_s = P_s \cdot A_s$, where $A_s$ is the inner surface of the opening. From Bondarev et al it is known that for alloy steel surfaces the maximum adhesion strength ($P_s$) between gas hydrate and said surface may be assumed $12 \cdot 10^5$ N/m² (=12 bar).

Finally the frictional forces ($F_f$) are determined with the normal force ($F_N$) with respect to the inner surface of the opening $A_s$ and the friction factor (f) between the two solid surfaces such that $F_f = f \cdot F_N$. The normal force $F_N$ is proportional to:

1. the pressure differential force $F_d$,
2. the Poisson's ratio of the gas hydrate (or any other solid under consideration),
3. the ratio of the opening cross section A1/A2

Since the first 2 variables are given with the process application under consideration, only the ratio A1/A2 is an independent design variable which, together with the height of the opening h, determines the divergence angle φ. The larger the cross sectional area at the outlet of the opening (A2), the larger the deformation of the hydrate volume in the direction of the longitudinal axis 12 of the opening, and hence the less the compression stress ($P_N$) in the radial direction (cylindrical opening) or transversal direction (rectangular opening).

The design criterion for the opening 330 now becomes: $F_d \geq F_s + F_N$, i.e. the sum of adhesion force $F_s$ and normal force $F_N$ should be less than the pressure force $F_d$, such that the hydrate is pushed out of the opening 330.

The above is a first order approximation of the physics that are involved. However, the first order approximation above shows that it is advantageously to provide tapered openings 330, with a certain divergence angle φ, i.e. in the range 10-50°.

For openings 330 having a circular cross section with a diameter d, the following applies:

$$\frac{P_d}{P_s + f \cdot P_N} \cdot \frac{d \cdot \cos\left(\frac{1}{2}\varphi\right)}{4 \cdot h} \geq 1$$

Likewise, for openings 330 having a rectangular cross section with a length l and width w, the following applies:

$$\frac{P_d}{P_s + f \cdot P_N} \cdot \frac{l \cdot w \cdot \cos\left(\frac{1}{2}\varphi\right)}{h \cdot 2(l + w)} \geq 1$$

In order to reduce the frictional forces ($F_f$) it is preferred to polish the interior surface of the opening to an average roughness of Ra<2 micron or Ra<0.6 micron.

So, according to an embodiment the interior surface of the openings 330, 330', 330", 330''', 330'''' have an average surface roughness (Ra) below 2 micron.

According to an embodiment the inner surface $A_s$ of the openings 330 exerts a water contact angle hysteresis below 25°, i.e. to reduce the adhesion force $F_s$ between the solid and the interior surface of the opening a material may be chosen exerting a difference between advancing and receding water contact angle of <25° or less than 15°.

To further avoid the accumulation of hydrate deposition, the internal surfaces of the openings may be coated with an icephobic coating. A suitable icephobic coating would be a fluorinated diamond like carbon (F-DLC). It is required that the surface roughness of said coating (and the underlying surface) is less than 0.05 micrometer in all directions though more preferably less than 0.02 micrometer in all directions. Any coating layer (e.g. ceramics, diamond-like carbon, elastomers, polymers) can be suitable as long as the static water contact angle on said surface is more than 90° or more preferably more than 110° while maintaining a difference between the advancing water contact angle and the receding water contact angle on said surface (i.e the hysteresis) of less than 25° but more preferably less than 15°.

Thus, the interior surface may be coated with a Diamond Like Carbon layer, with a layer thickness of more than 3 micron.

Such materials may comprise Diamond Like Carbon coatings primarily consisting of poly-crystalline carbon bonds. According to an embodiment, the Diamond Like Carbon layer comprises one or more of the bonds Carbon-Fluor, Carbon-Silicon, Carbon-Oxygen, Carbon-Hydrogen. Thus, the Diamond Like Coating may comprise bonds of carbons with one of the following atoms, Fluor (F), Silicon (S), Oxygen (O) and/or Hydrogen (H). Said Diamond Like Carbon coatings can be applied on the base material (e.g. alloy steel) with a layer thickness of more than 3 micron or more preferably more than 6 micron.

Radial Opening

Figure 4A:
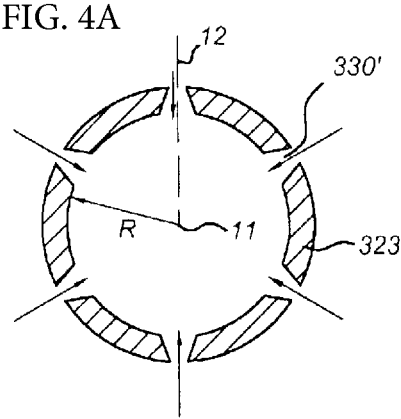

According to embodiments schematically depicted in FIG.'s 4a-4e there is provided a throttling valve, wherein the openings 330' have a substantial radial orientation with respect to a central axis of the perforated sleeve 323. Thus, the openings 330' are substantial rectangular to the cylindrical surface of the sleeve 323. An example of this is shown in FIG. 4a.

Figure 4C:
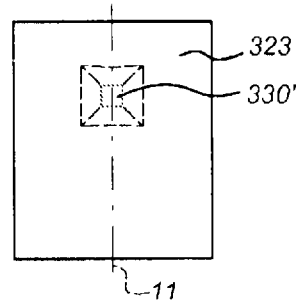
Figure 4B:
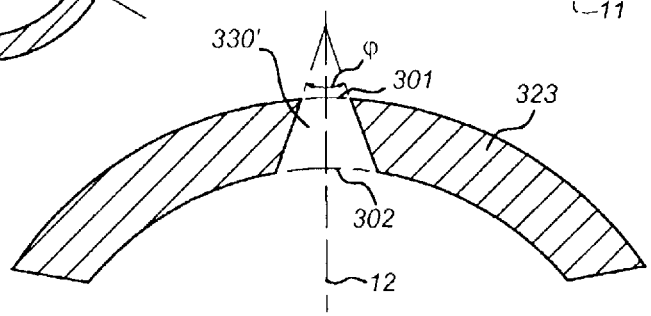
Figure 4D:
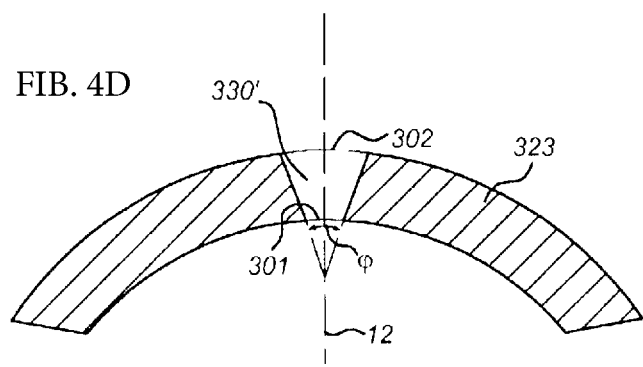
Figure 4E:
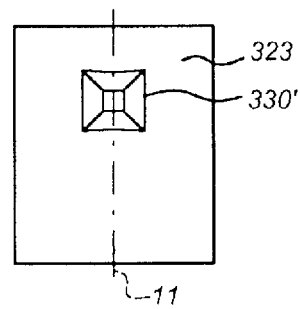

A more detailed view is shown in FIG. 4b, wherein it is shown that the inlet 301 is substantially smaller than the outlet 302. The inner walls of the openings 330' may be at a divergence angle φ, as defined above, creating a widening opening in the downstream direction. FIG. 4c shows a top view of perforated sleeve 323 showing just one opening 330' by way of example.

As can be seen, the longitudinal axes 12 of the openings 330' go substantial through the central axis 11, i.e. at a distance (not shown), which is between 0 and 0.1 times the internal radius R of the sleeve 323. The longitudinal axis 12 is in a direction that evenly divides the divergence angle φ (bisector).

FIG.'s 4d and 4e schematically depict another example, in which the downstream direction is chosen from the inside of the perforated sleeve 323 to the outside of the perforated sleeve 323. As can be seen in the top view of the perforated cage 323 the opening 330' is bigger on the outside of the perforated cage 323 than on the inside of the perforated cage 323.

Tangential Opening

Figure 5A:
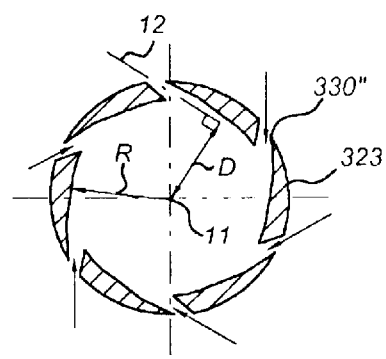
Figure 5B:
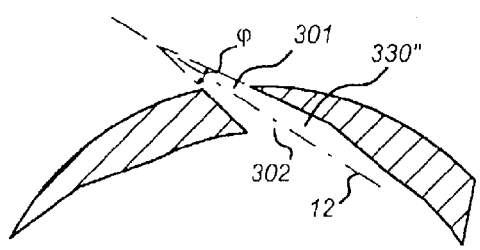

According to a further embodiment there is provided a throttling valve, wherein longitudinal axes 12 of the openings 330" have a substantial tangential component relative to a central axis of the perforated sleeve 323. An example is shown in FIG. 5a.

The openings 330" form swirl imparting means which impose a swirling motion to the fluid stream flowing through the fluid outlet channel 27, wherein the swirl imparting means are oriented such that the fluid stream swirls about a longitudinal axis 11 of the fluid outlet channel 27 thereby inducing liquid droplets to swirl towards the outer periphery of the fluid outlet channel 27 and to coalesce. This effect is explained in more detail above with reference to FIG.'s 2a-d.

Figure 5C:
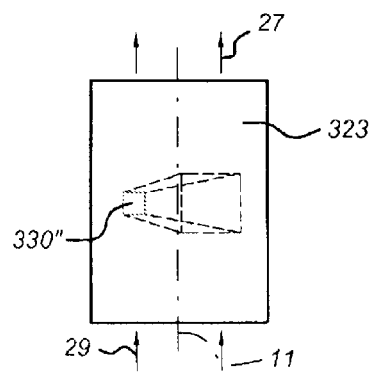
Figure 5D:
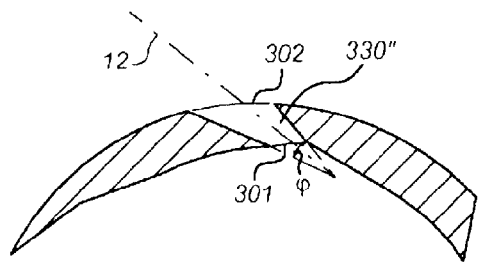
Figure 5E:
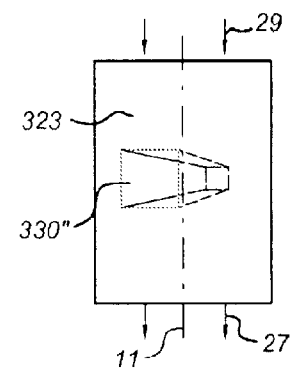

A more detailed view is shown in FIG.'s 5b and 5c, wherein it is shown that the inlet 301 is substantially smaller than the outlet 302, thereby creating a widening opening in the downstream direction. In FIG. 5c the fluid outlet channel 27 and the fluid inlet channel 29 are indicated, together with arrows indicating the flow direction. The inner walls of the openings 330" may be at a divergence angle φ, which may be as defined above. Again, the longitudinal axis 12 is defined as the bisector of the divergence angle φ.

Thus, the longitudinal axes 12 of the openings 330" cross the central axis 11 at a distance D, which is between 0.2 and 1, preferably between 0.5 and 0.99 times the internal radius R of the sleeve 323. This is similar to the example provided with reference to FIG.'s 2a-d, although the openings 330" are now widening or tapered.

The inner walls of the openings 330" may for instance be an oblique conic section, i.e. in case round openings 330" are provided.

FIG.'s 5d and 5e schematically depict another example, in which the downstream direction is chosen from the inside of the perforated sleeve 323 to the outside of the perforated sleeve 323. This embodiment combines the advantages of the widening openings (self discharging shape) with the advantages of adding swirl to the flow.

Axial Opening

Figure 6A:
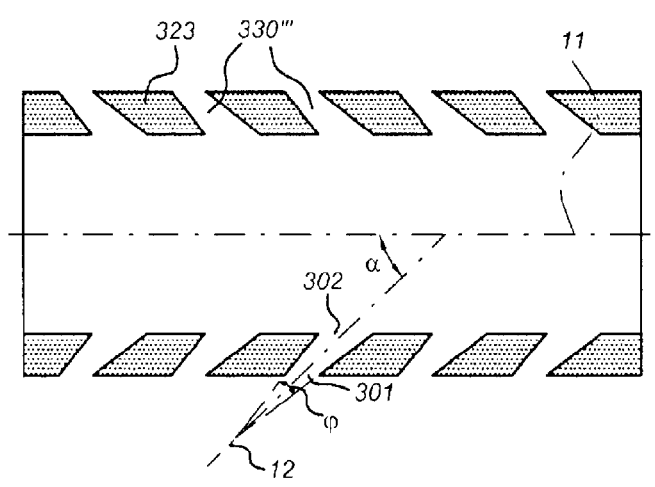
Figure 6B:
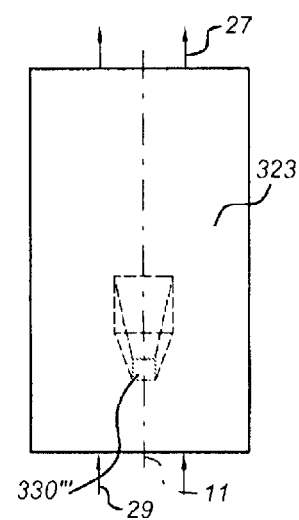
Figure 6C:
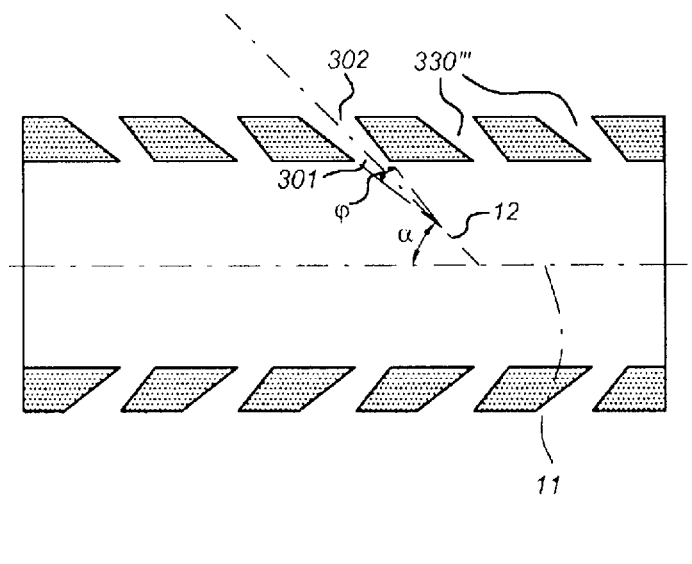
Figure 6D:
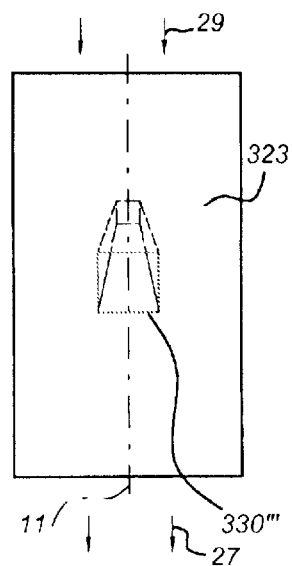

According to embodiments there is provided a throttling valve, wherein longitudinal axes 12 of the openings 330''' have a substantial axial component relative to a central axis of the perforated sleeve 323. Examples of this are shown in FIG.'s 6a-6d. FIG.'s 6a and 6c show a side view of the perforated sleeve according to these embodiments. In the example of FIG. 6a, the downstream direction is from the outside to the inside of the perforated sleeve 323, in the example of FIG. 6c, the downstream direction is from the inside to the outside of the perforated sleeve 323. FIG.'s 6b and 6d show top view of the perforated sleeve 323 corresponding to FIG.'s 6a and 6c respectively.

The axial oriented openings 330''' have the advantage that less erosion is generated by the stream, as the streamlines as coming out of the axial oriented openings (i.e. the efflux) enclose a smaller angle with objects that they may encounter, such as an outer surface of the piston-type valve body 22 (in case the flow is from the outside to the inside of the perforated sleeve 323) or an inner surface of the valve housing 21 (in case the flow is from the inside to the outside of the perforated sleeve 323). As a result, the impact angle of solid materials which are transported by the fluid stream by advection is reduced. This reduced impact angle results in less erosion if said opposite surface is hardened typically >1200 Vickers. The longitudinal axes 12 of the openings 330''' may have an orientation where they cross the central axis 11 of the throttling valve at an angle α which is in the range 20°<α<70°, preferably in the range 20°<α<30°.

The inner walls of the openings 330''' are at a divergence angle φ, which may be defined as above.

Tangential and Axial Opening

According to embodiments there is provided a throttling valve, wherein the longitudinal axes 12 of the openings 330'''' have a substantial tangential component relative to a central axis of the perforated sleeve 323 and a substantial axial component relative to a central axis of the perforated sleeve 323.

Examples of such openings are provided in FIG.'s 7a and 7b, both showing a top view of the perforated sleeve 323 with just one opening 330'''' by way of example.

Figure 7A:
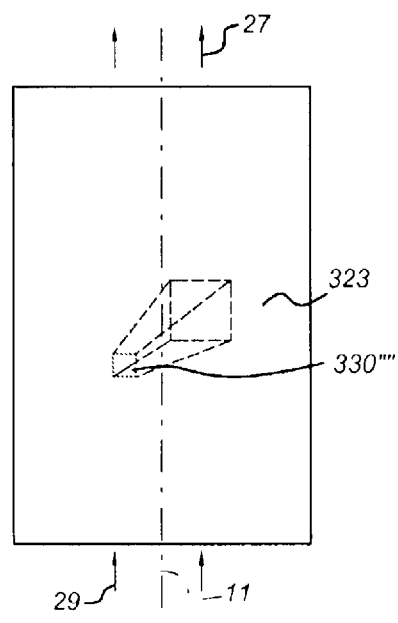
Figure 7B:
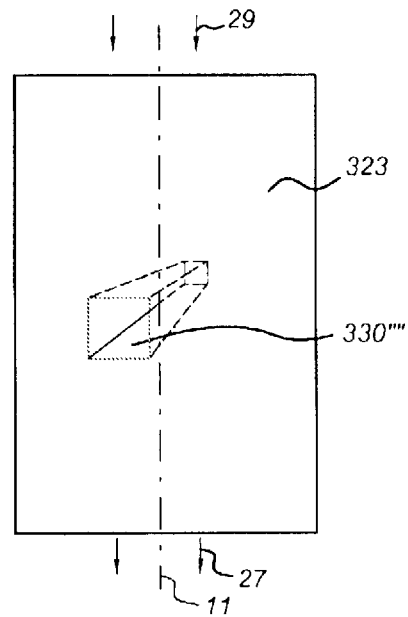

In the example of FIG. 7a, the downstream direction is from the outside to the inside of the perforated sleeve 323. In the example of FIG. 7b, the downstream direction is from the inside to the outside of the perforated sleeve 323. In both examples, the openings 330'''' widen in the downstream direction.

The longitudinal axes 12 of the openings 330'''' may have an orientation where they cross the central axis 11 of the throttling valve at an angle in the range of 20°-70°, preferably in the range 20°-30°. Again, the divergence angle φ of the openings 330'''' is as defined above.

This provides a throttling valve combining the advantages of both the axial and tangential embodiments provided above.

Reversed Flow Operation

All above mentioned tapered valve configurations may be operated in two flow modes. This means the openings may widen in from outside to inside or from inside to outside. The latter option may be favorable when a lower exit velocity of the fluid is required (e.g. for erosion)

Further Embodiments

It is noted that providing openings with an axial component (optionally also with a tangential component) may also be used without the feature that the openings widen in a downstream direction. It will be understood that these embodiments may be combined with all features and details of the embodiments provided above.

An examples is shown in FIG.'s 9a-9c.

According to such an embodiment there is provided a throttling valve, comprising a fluid inlet 29 and a fluid outlet 27, the throttling valve being arranged to control a flux of a fluid stream flowing via a flow path from the fluid inlet 29 to the fluid outlet 27, the flow path comprising a plurality of openings 430 which, in use, create a pressure reduction over the throttling valve and thereby a cooling effect of the fluid, wherein longitudinal axes 12 of the openings 430 have a substantial axial component relative to a central axis 11 of the throttling valve. It will be understood that these embodiments may be combined with all features and details of the embodiments provided above.

An example is shown in FIG.'s 9a-9b.

Figure 9A:
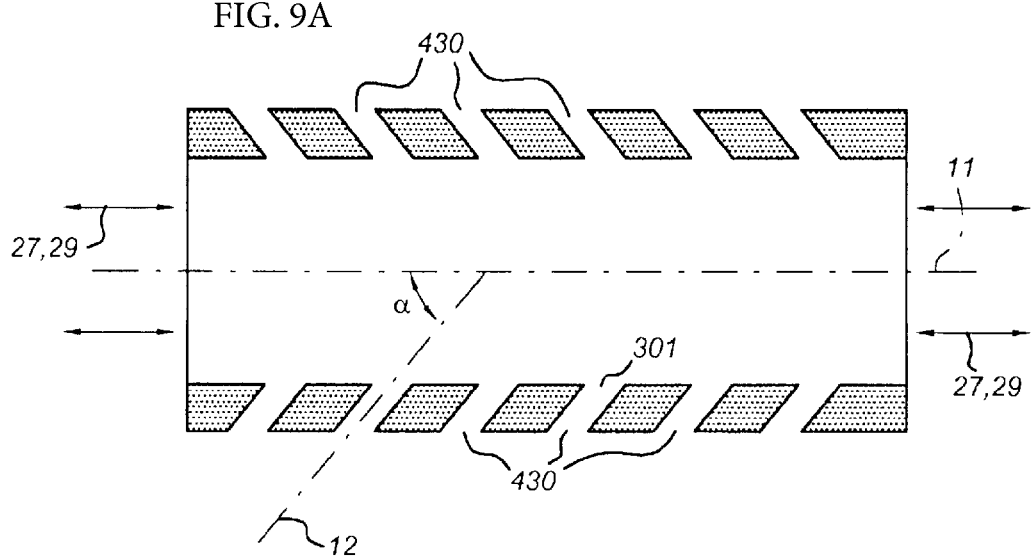

FIG. 9a shows a side view of the perforated sleeve according to this embodiment. In the example of FIG. 9a, the downstream direction may be from the outside to the inside of the perforated sleeve or from the inside to the outside of the perforated sleeve, as indicated by the double-arrows.

Figure 9B:
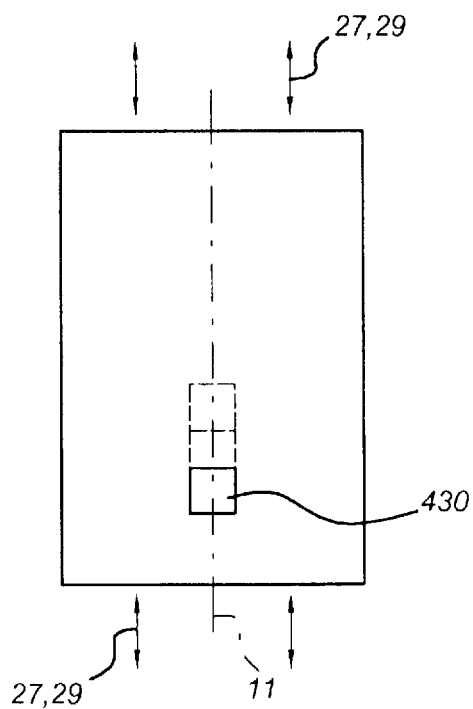

FIG. 9b shows a top view of the perforated sleeve wherein it is shown that the longitudinal axes of the openings 430 have a substantial axial component relative to a central axis 11 of the perforated sleeve and/or throttling valve.

The longitudinal axes 12 of the openings 430 may have an orientation where they cross the central axis 11 of the throttling valve at an angle α which is in the range $20°<\alpha<70°$, preferably in the range $20°<\alpha<30°$.

The axial oriented openings 430 have the advantage that less erosion is generated by the stream, as the streamlines enclose a smaller angle with the tubular wall surface of the perforated sleeve, hence reducing the impact angle of solid materials which are transported by the fluid stream by advection.

According to a further embodiment there is provided a throttling valve, comprising a fluid inlet 29 and a fluid outlet 27, the throttling valve being arranged to control a flux of a fluid stream flowing via a flow path from the fluid inlet 29 to the fluid outlet 27, the flow path comprising a plurality of openings 430 which, in use, create a pressure reduction over the throttling valve and thereby a cooling effect of the fluid, wherein longitudinal axes 12 of the openings 430 have a substantial axial component relative to a central axis 11 of the throttling valve and the longitudinal axes 12 of the openings 430 have a substantial tangential component relative to the central axis of the throttling valve.

Figure 9C:
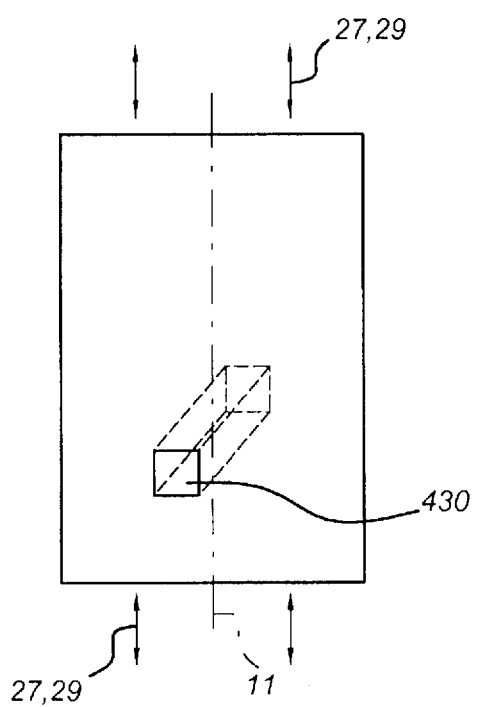

An example is shown in FIG. 9c. This embodiment combines the advantages of the embodiment described above with reference to FIG.'s 9a and 9b with the feature of adding a swirl to the fluid stream, allowing separation of components.

Further Remarks

It will be apparent to the person skilled in the art that other alternative and equivalent embodiments of the invention can be conceived and reduced to practice without departing from the spirit of the invention, the scope of the invention being limited only by the claims set out below.

The invention claimed is:

1. A throttling valve comprising:
   a valve housing (21) including a fluid inlet (29) and a fluid outlet (27);
   a perforated sleeve (323) axially arranged within the valve housing about a central axis (11) extending from the fluid inlet (29) to the fluid outlet (27) such that a flow path from the fluid inlet to the fluid outlet passes from an outside of the perforated sleeve to an inside of the perforated sleeve, the perforated sleeve (323) having a plurality of openings (330);
   wherein a flux of a fluid stream flowing via the flow path from the fluid inlet (29) to the fluid outlet (27) is controllable via the plurality of openings (330) of the perforated sleeve which, in use, create a pressure reduction over the throttling valve and thereby a cooling effect of the fluid stream,
   wherein each of the openings (330) widens from the outside of the perforated sleeve (323) to the inside of the perforated sleeve (323) in a downstream direction of the flow path along longitudinal axes (12) of the openings (330); and
   wherein the longitudinal axes (12) of the openings (330''') have a substantial axial component relative to the central axis.

2. The throttling valve according to claim 1, wherein the openings (330) have a divergent angle φ in the range 10°-50°.

3. The throttling valve according to claim 1, wherein the throttling valve further comprises a piston type valve body (22), the piston type valve body (22) being slideably arranged with respect to the perforated sleeve (323), to control the flux of the fluid stream through the openings (330).

4. The throttling valve according to claim 1, wherein the openings (330') have a substantial radial orientation with respect to a central axis of the perforated sleeve (3).

5. The throttling valve according to claim 1, wherein longitudinal axes (12) of the openings (330'') have a substantial tangential component relative to a central axis of the perforated sleeve (323).

6. The throttling valve according to claim 1, wherein the longitudinal axes (12) of the openings (330'''') have a substantial tangential component relative to a central axis of the perforated sleeve (323) and a substantial axial component relative to a central axis of the perforated sleeve (323).

7. The throttling valve according to claim 1, wherein the axial component of the longitudinal axes (12) is at an angle α with respect to a central axis 11 of the throttling valve which is in the range $20°<\alpha<70°$, or in the range $20°<\alpha<30°$.

8. The throttling valve according to claim 1, wherein the interior surface of the openings (330, 330', 330'', 330''', 330'''') having an average surface roughness (Ra) below 2 micron.

9. The throttling valve according to claim 8 wherein the interior surface of the openings (330, 330', 330'', 330''', 330'''') exerts a water contact angle hysteresis below 25°.

10. The throttling valve according to claim 9 wherein the interior surface is coated with a Diamond Like Carbon layer with a layer thickness of more than 3 micron.

11. The throttling valve according to claim 10 wherein the Diamond Like Carbon layer comprises one or more of the bonds Carbon-Fluor, Carbon-Silicon, Carbon-Oxygen, Carbon-Hydrogen.

12. A method for controlling flux of a fluid stream, the method comprising:
    providing a fluid stream to a fluid inlet of a throttling valve including a valve housing defining a flow path extending from the fluid inlet to a fluid outlet, and a perforated shield axially arranged about a central axis of the valve housing extending between the fluid inlet and the fluid outlet such that a flow path from the fluid inlet to the fluid outlet passes from an outside of the perforated sleeve to an inside of the perforated sleeve; and
    operating the throttling valve to control the flux of the fluid stream via the flow path,
    wherein a plurality of openings of the perforated shield create a pressure reduction over the throttling valve and thereby a cooling effect on the fluid stream,
    wherein each of the openings widens from the outside of the perforated sleeve to the inside of the perforated sleeve and in a downstream direction of the flow path along longitudinal axes (12) of the openings (330);
    wherein the longitudinal axes of the openings have a substantial axial component relative to a central axis of the perforated sleeve.

13. A throttling valve comprising:
    a valve housing having a fluid inlet and a fluid outlet;
    a flow path through the valve housing extending from the fluid inlet to the fluid outlet; and
    a perforated sleeve axially arranged within the flow path about a central axis of the valve housing extending from the fluid inlet to the fluid outlet such that the flow path from the fluid inlet to the fluid outlet passes from an outside of the perforated sleeve to an inside of the perforated sleeve and including a plurality of openings adapted to create a pressure reduction over the throttling valve to thereby cool a fluid stream moving along the flow path from the fluid inlet to the fluid outlet;

wherein the width of each of the openings widens from the outside of the perforated sleeve to the inside of the perforated sleeve and in a downstream direction of the flow path along longitudinal axes (12) of the openings (330); and wherein the longitudinal axes of the openings have a substantial axial component relative to a central axis of the perforated sleeve.

14. The throttling valve of claim 13, wherein the openings have a divergent angle φ in the range of 10° to 50°.

15. The throttling valve of claim 13, further comprising a piston type valve body slideably arranged with respect to the perforated sleeve to control the flux of the fluid stream through the openings.

16. The throttling valve of claim 13, wherein the openings have a substantial radial orientation with respect to a central axis of the perforated sleeve.

17. The throttling valve of claim 13, wherein an interior surface of the openings is coated with a Diamond-like carbon layer with a layer thickness of more than 3 micron.

* * * * *